Figure 1:
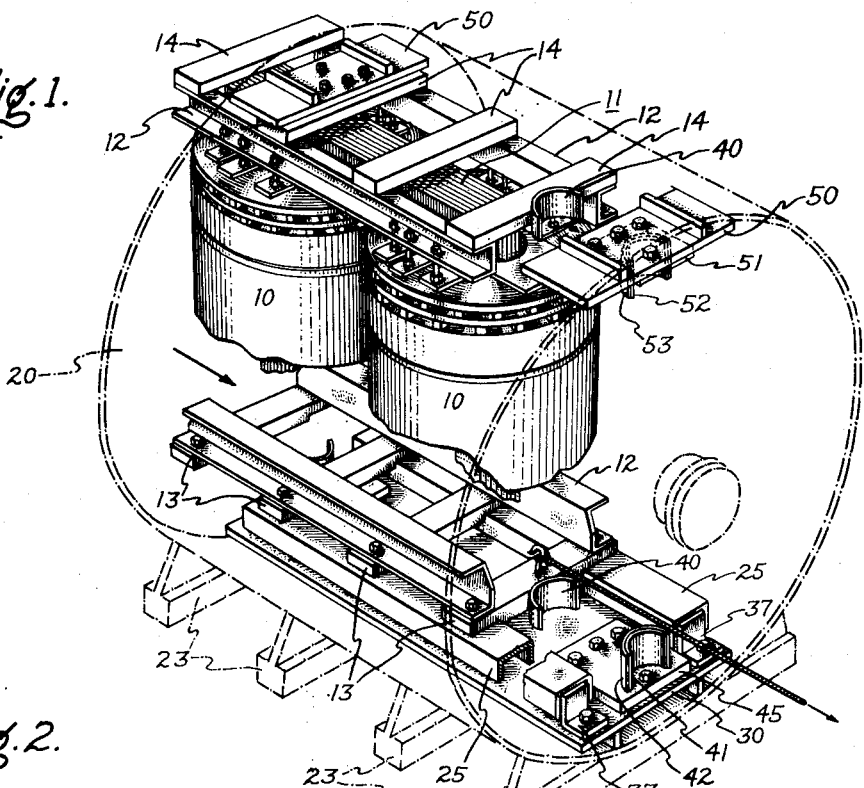

June 21, 1960 G. CAMILLI ET AL 2,942,216
ELECTRICAL APPARATUS AND ENCLOSURE THEREFOR
Filed March 26, 1959 3 Sheets-Sheet 1

Inventors,
Guglielmo Camilli,
Stanley H. Wilk,
by Gilbert P. Carlson
Their Attorney.

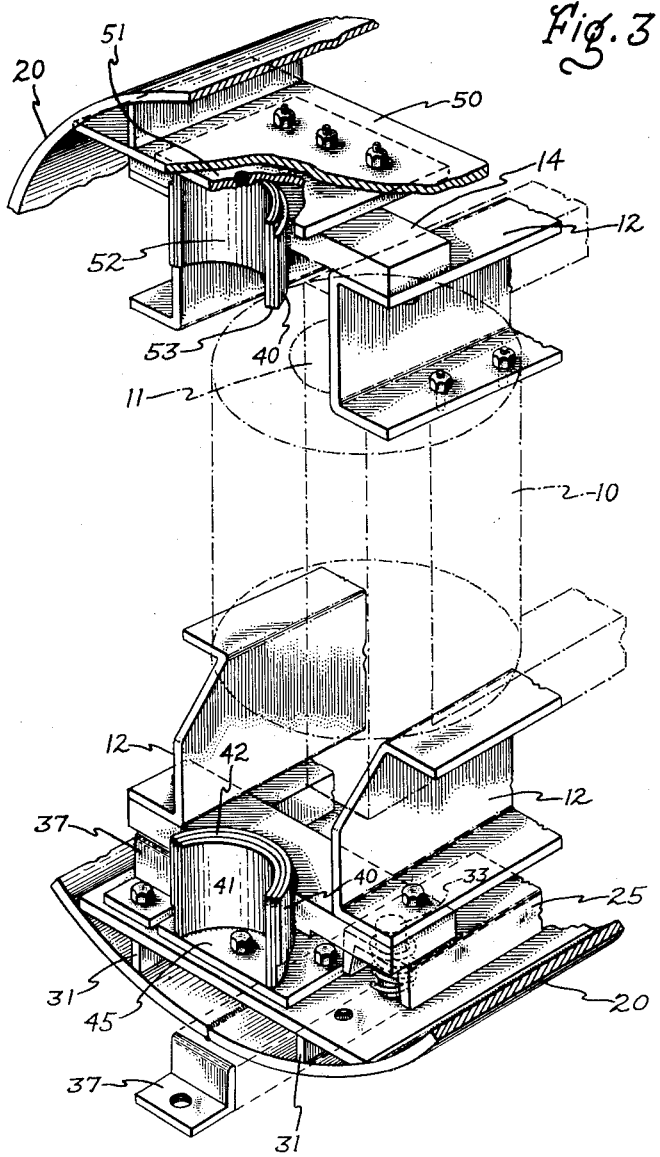

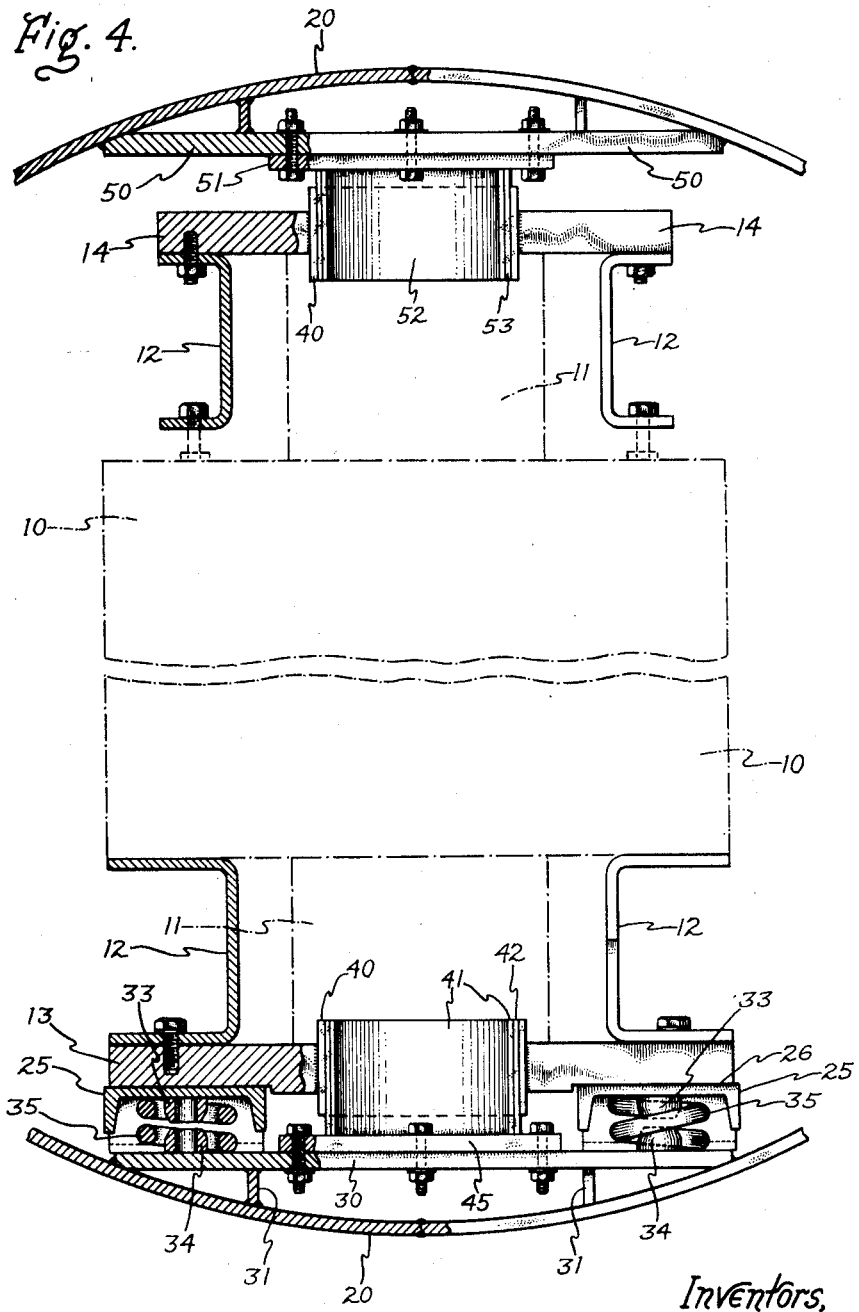

United States Patent Office 2,942,216
Patented June 21, 1960

2,942,216
ELECTRICAL APPARATUS AND ENCLOSURE THEREFOR
Guglielmo Camilli and Stanley H. Wilk, Pittsfield, Mass., assignors to General Electric Company, a corporation of New York
Filed Mar. 26, 1959, Ser. No. 802,200
9 Claims. (Cl. 336—92)

This invention relates to stationary electrical induction apparatus, such as transformers of the type employed in systems for the generation and distribution of electrical power. More in particular, the invention relates to an enclosure for such apparatus, the enclosure being especially useful when dielectric fluids within the enclosure are pressurized.

Stationary electrical induction apparatus of one type are comprised of one or more electrical windings surrounding the winding legs of a magnetic core. The windings and core are frequently immersed in a dielectric liquid within a sealed enclosure, the liquid serving to increase the dielectric strength of the apparatus, as well as to cool the windings and core. In order to position the windings and core within the enclosure, the enclosure usually is provided with a removable top whereby a crane or other lifting equipment may be employed to lower the windings and core into the enclosure. In the past this has appeared to be the most suitable method for handling the tremendous weights present in the windings and core of large power transformers.

With the recent commercial availability of high dielectric strength electro-negative gases, such as sulfur-hexafluoride, the advantages of employing such gases as the dielectric insulation of transformers has become commercially realizable. Many of such gases have higher dielectric strength than the conventionally employed transformer oil, the gases are not inflammable, a substantial reduction in apparatus weight arises when the oil is substituted by a gas, and the gas serves to attenuate any noise generated in the windings and core. When employing such gases, it is preferred that the gas be pressurized in order to further increase its dielectric strength. The increase in pressure also increases the density of the gas, so that it becomes a more efficient coolant than in the non-pressurized state.

When high strength gases are employed under pressure, it is of course desirable that the enclosure be formed into a cylindrical or spherical shape in order that it may withstand the internal pressure without the necessity for excessive bracing. While the provision of such shape enclosures for high pressure applications is well known, certain problems arise when it is desired that an electrical apparatus be enclosed within the enclosure.

In order to minimize the space occupied by the enclosure, it is desirable that the main body of the enclosure surrounding the windings and core be cylindrical and have a horizontal axis. When such a configuration is employed, however, the previously employed method of lowering the windings and core into the enclosure becomes impractical, since it requires joints in the cylindrical enclosure, as well as joints between the end bells and the cylindrical central portion. For this reason, pressurized gas insulated transformers have previously been fabricated according to the conventional practice whereby the windings and core could be lowered into the enclosure. The horizontal cylindrical enclosure also presents the problem of holding the core and windings from movement after they have been positioned within the enclosure, and similarly, vibration control mounting means to reduce the transmission of noise through the transformer base has also presented a problem.

It is therefore an object of this invention to provide means for facilitating the mounting of a stationary electrical induction apparatus within a cylindrical enclosure having a horizontal axis.

It is also an object to provide means for holding stationary electrical induction apparatus within a cylindrical enclosure having a horizontal axis.

A further object of this invention is to provide means for resiliently mounting a stationary electrical induction apparatus within a cylindrical enclosure having a horizontal axis.

A still further object of this invention is to provide a stationary electrical induction apparatus of a type having a winding and core disposed within a sealed enclosure, the apparatus being characterized by the fact that the enclosure is cylindrical and has a horizontal axis, splitting of the cylindrical enclosure is not required in order to position the core and windings within the enclosure, and wherein means are provided to resiliently mount the windings and core within the enclosure, and means are also provided to brace the windings and core within the enclosure.

Briefly stated, in accordance with one aspect of this invention we provide a stationary electrical induction apparatus comprising a winding and magnetic core disposed within a cylindrical enclosure having a horizontal axis. The enclosure has end bells of a rounded shape, preferably torispherical. A pair of resiliently mounted horizontal tracks are provided within the enclosure, the tracks being parallel to the axis of the enclosure and affixed to the enclosure. Support means are provided for the core on the lower side of the core, the support means being adapted to be supported on the tracks. Means are provided for preventing horizontal movement of the support means and windings and core without impeding vertical movement of the apparatus.

While the specification concludes with claims particularly point out and distinctly claiming the subject matter which we regard as our invention, it is believed that the invention will be better understood from the following description taken in connection with the accompanying drawings.

In the drawings:
Fig. 1 is a perspective partially broken away view of a transformer partially moved into place in a cylindrical enclosure according to one aspect of the invention. The enclosure is illustrated in phantom for the sake of clarity of the drawing, Fig. 2 is a side view of the apparatus of Fig. 1, the enclosure being illustrated in cross-section in a vertical plane extending through the axis thereof, Fig. 3 is a perspective partially cross-sectional view of a portion of an electrical induction apparatus and enclosure according to the invention, and illustrating the means for holding the windings and core in position within the enclosure, and Fig. 4 is an end view of the apparatus of Fig. 3, with one side being illustrated in cross section in a vertical plane normal to the axis of the enclosure and passing through one of the resilient supports.

Figure 2:
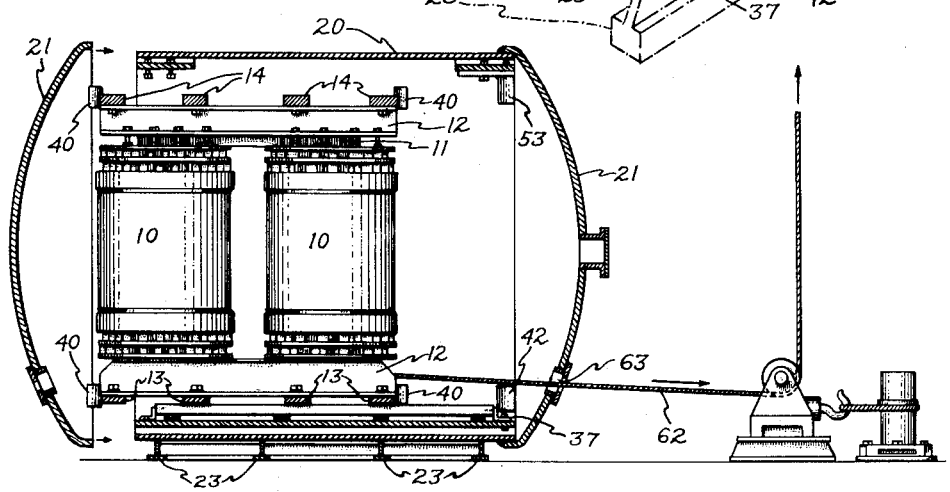

Referring now to Figures 1 and 2, therein is illustrated an electrical apparatus such as a transformer comprising a plurality of windings 10 surrounding the winding legs of a magnetic core 11. The core 11 may be conventionally comprised of a plurality of stacks of flat magnetic strips arranged to form a plurality of parallel winding legs extending between and adjoined to a pair of parallel core yokes. While the axes of the windings and winding core legs are illustrated in Figures 1 and 2 as being vertical, and the core yokes are illustrated as being horizontal, it is to be understood that other angular dispositions of the windings and the core may be employed without departing from the spirit or scope of the invention.

Each of the yokes of the core are supported between a pair of core clamps 12, which may conventionally be comprised of channel-shaped horizontal structural material. A plurality of horizontal supporting bars 13 are provided extending beneath and connected to the core clamps 12 clamping the lower yoke. The supporting bars 13 may, for example, be bolted to the under side of the clamps 12. Similar supporting bars 14 may also be provided clamped between the upper core clamps 12 above the top of the core 11.

The apparatus is disposed within pressurized gas-filled enclosure comprising a main cylindrical portion 20 having a horizontal axis. The cylindrical portion 20 has a length substantially equal to the over-all length of the winding and core assembly (i.e. substantially co-extensive with the core and winding assembly), so that when the apparatus is mounted within the enclosure it will not protrude beyond the ends of the cylindrical portion 20. The enclosure is also provided with end bells 21 adapted to be sealed, for example, as by welding, over the ends of the cylindrical portion 20. The end bells 21, preferably have a torispherical shape, although other shapes that will enable the enclosure to withstand the internal pressure may also be employed. Suitable supports 23 may be affixed to the external side of the enclosure, for example to the cylindrical main portion 20, to prevent rolling of the enclosure.

A pair of horizontally extending tracks 25 are provided resiliently mounted to the bottom of the enclosure. As illustrated more clearly in Figures 3 and 4, the tracks 25 may be comprised of channel shaped structural members with the flat web portions 26 facing upwardly to provide a sliding surface for the transformer.

In order to support the tracks 25, a horizontal plate 30 is provided rigidly affixed to the bottom of the cylindrical portion 20 of the enclosure, the plate 30 extending for substantially the entire length of the cylindrical portion 20, and having a width substantially equal to the over-all distance between opposite sides of the tracks 25. If desired, the plate 30 may be further supported by additional braces 31, extending between the bottom of the cylindrical portion 20 and the under side of the plate 30. A plurality of projections 33 are provided on the under side of the web of the tracks 25, and these are aligned with projections 34 extending upwardly from the top of the supporting plate 30. Helical springs 35 surrounding the projections 33 and 34 serve to resiliently support the tracks 25 above the plate 30. The projections 33 and 34 serve as spring guides for the springs 35, thereby to prevent horizontal displacement of the springs 35. The projections 33 and 34 may also be sufficiently long that their ends engage each other if excessive downward force is applied to the tracks 25, although the springs 35 must be sufficiently strong to resiliently support the dead weight of the apparatus.

As illustrated in Figures 1 and 2, the lower sides of the horizontal bars 13 extend transversely of the tracks 25, and are supported on the upper sides of the webs of the tracks 25. The apparatus, which is supported on the horizontally extending bars 13, may be thus slid into the cylindrical portion 20 of the enclosure on the tracks 25. In order to facilitate the sliding of the transformer into place, a stable non-corrosive grease, such as silicone grease, may be applied to the tracks 25. The ends of the bars 13 may be stepped, as illustrated in Fig. 4, to prevent the bars from slipping transversely of the tracks. Horizontal movement of the tracks 25 is prevented by angle-shaped members 37 affixed to the plate 30 and engaging the ends of the tracks. The members 37 prevent excessive horizontal forces on the supporting springs 35 while the apparatus is being slid into the enclosure.

While the angle-shaped members 37 are provided on each end of the tracks 25, they must not hold the tracks 25 rigidly in order that the resilient mounting by means by springs 35 is not lost.

In order to prevent horizontal movement of the apparatus when it is positioned within the enclosure, curved plates 40 are provided rigidly affixed to the endmost supporting bars 13 and 14 on each end of the upper and lower core clamps. The radii of curvature of the curved plates 40 have vertical axes, and the concave surfaces of the plates 40 face away from the center of the apparatus. Similarly shaped curved members 41 are provided affixed to each end of the supporting plates 30. The curved plates 41 also have vertical axes, and the convex surfaces of the plates 41 are directed toward and aligned with the respective curved plates 40 on each end of the winding and core assembly. The convex surface of the curved plates 41 may be lined with a resilient material 42. In order to facilitate removal of the plates 41, they may be rigidly affixed, as by welding, to horizontal plates 45, the plates 45 being in turn bolted to the supporting plate 30.

A supporting plate 50 is provided rigidly affixed to the upper inside ends of the cylindrical portion 20, the plates 50 also being horizontal. Plates 51 bolted to the under side of the plates 50 carry curved plates 52. The curved plates 52 have curvatures similar to that of the curved plates 40 and 41, with their convex surfaces directed toward the curved plates 40 affixed to the bars 14 on the upper ends of the core assembly. The curved plates 52 are horizontally aligned with the upper curved plates 40, and their convex surfaces may also be lined with a layer 53 of resilient material.

In order to mount the apparatus within the enclosure, a suitable grease 25 may be first applied to the tracks 25 to facilitate the sliding of the apparatus into the enclosure. The apparatus is then lifted to substantially the height of the tracks 25 and the apparatus is horizontally moved until the bars 13 engage the tracks 25. Then the bars 13, which support the apparatus, are slid along the track by any convenient means until the curved plates 40 engage the curved plates 52 and 41 on one end of the cylindrical portion 23 in horizontally overlapping or nesting relationship. For example, a rope or cable 62 may be affixed to one end of the core assembly, the cable 62 passing through an aperture 63 in the end bell 21 of the enclosure. The cable 62 may be then pulled horizontally from externally of the enclosure to provide the necessary horizontal force to slide the apparatus into position within the enclosure.

The end bell 21 toward which the apparatus is slid may be welded or otherwise sealed in position before the windings and core are slid into position. In this event, the curved plates 41 and 52 must also be mounted on the closed end of the enclosure before the apparatus is slid into place. The curved plates 41 and 52 on the open end of the cylindrical portion 20 are not mounted, however, until the apparatus has been slid to its final positions with the curved plates 40 nesting with the curved plates 52 and 41 on the closed end of the cylindrical portion 20. After the apparatus has been slid to its final position, the curved plates 52 and 41 on the open end of the cylindrical portion 20 are mounted, so that they nest with the curved plates 40 on the respective ends of the core assembly. Then the other end bell 21 may be sealed into position over the open end of the cylindrical portion 20.

By providing resiliently mounted tracks within the enclosure, the present invention has provided means whereby an electrical apparatus may be mounted within a cylindrical enclosure having a horizontal axis. Since the curved plates 40 on the apparatus engage the curved plates 41 and 52 on each end of the top and bottom of the enclosure, the apparatus is firmly held against horizontal displacement within the enclosure. Since the radii of curvature of the curved plates 40, 41 and 52 have vertical axes, the holding action of these curved plates does not interfere with vertical movement of the apparatus within the enclosure, and thus does not interfere with the resilient mounting provided by the springs 35.

It will be understood, of course, that while the form of the invention herein shown and described constitutes the preferred embodiment of the invention, it is not intended herein to illustrate all of the possible equivalent forms or ramifications thereof. It will also be understood that the words employed are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. Stationary electrical induction apparatus comprising a magnetic core having a winding leg, a winding surrounding said winding leg, support means for said core, cylindrical enclosure means having a horizontal axis, said core and windings being disposed within said enclosure, a pair of horizontal track means extending longitudinally of said enclosure and resiliently supported within said enclosure, said support means for said core being slidably supported on said track means, and means for preventing horizontal movement of said support means without impeding vertical movement of said resiliently mounted track means.

2. Stationary electrical induction apparatus comprising a magnetic core having a winding leg, a winding surrounding said winding leg, support means for said core, cylindrical pressurized gas-filled enclosure means having a horizontal axis, said core and windings being disposed within said enclosure, a pair of horizontal track means extending longitudinally of said enclosure and resiliently supported in said enclosure, said support means for said core means slidably supported on said track means, and means for preventing horizontal movement of said support means without impeding vertical movement of said resiliently mounted track means comprising first plate means affixed to the ends of said core, and second plate means affixed to said enclosure means, said first and second plate means being in horizontal over-lapping contacting relationship.

3. Stationary electrical induction apparatus comprising a magnetic core having a winding leg, a winding surrounding said winding leg, support means for said core, a cylindrical enclosure having a horizontal axis, said core and windings being disposed within said enclosure, a pair of horizontal track means extending longitudinally of said enclosure and resiliently supported within said enclosure, said support means for said core being slidably supported on said track means, and means for preventing horizontal movement of said support means without impeding vertical movement of said resiliently mounted track means comprising first curved plate means affixed to the ends of said core, and second curved plate means affixed to said enclosure adjacent the ends of said core, said first and second curved plate means having vertical axes of curvature and being in nested relationship.

4. Stationary electrical induction apparatus comprising a magnetic core having a winding leg, a winding surrounding said winding leg, support means for said core on the lower side thereof, cylindrical pressurized gas-filled enclosure means having a horizontal axis, said core and winding means disposed in said enclosure, said enclosure means being essentially co-extensive with said core and windings, a pair of horizontal track means extending longitudinally of said enclosure and resiliently mounted to the bottom of said enclosure, said support means for said core being slidably supported on said track means, means for preventing horizontal movement of said support means without impeding vertical movement of said resiliently mounted track means comprising first curved plate means affixed to said support means adjacent the ends of said core, and second curved plate means affixed to said enclosure adjacent the ends of said core, said first and second curved plate means having vertical axes of curvature and being in nested relationship, and end bells covering the ends of said cylindrical enclosure means.

5. Stationary electrical induction apparatus comprising a magnetic core having a plurality of vertical winding leg members extending between and joining a pair of horizontal yoke members, electrical windings on said winding leg members, support means, for said core affixed to the lower-most of said yoke members, enclosure means surrounding said core and windings, said enclosure means comprising a cylindrical portion having a horizontal axis and being substantially co-extensive with said core and windings, a pair of horizontal track means extending longitudinally of said enclosure and resiliently supported within said enclosure, said support means for said core being slidably supported on said track means, and means for preventing horizontal movement of said support means without impeding vertical movement of said resiliently mounted track means.

6. The electrical apparatus of claim 5 in which said means for preventing horizontal movement for said support means comprises first curved plate means affixed to said support means adjacent the ends of said lower-most yoke member, second curved plate means affixed to said enclosure adjacent the ends of said lower-most yoke member, and said first and second curved plates have vertical axes of curvature and are in nested relationship at each end of said lower-most yoke member.

7. Stationary electrical induction apparatus comprising a magnetic core having a plurality of vertical winding leg members extending between and adjoining a pair of horizontal yoke members, electrical windings on said winding leg members, support means on the lower-most of said yoke members, a pressurized gas-filled enclosure surrounding said core and windings, said enclosure comprising a cylindrical portion having a horizontol axis and being substantially co-extensive with said core and windings, horizontal plate means affixed to the bottom of said cylindrical portion, horizontal track means resiliently mounted on said horizontal plate means and extending axially of said cylindrical portion said support means being slidably positioned on said track means, first curved plate means on said support means at each end of said core, second curved plate means on said horizontal plate means at each end of said support means, said first and second curved plate means having vertical axes of curvature and being nested at each end of said support means, and end bells covering the ends of said cylindrical portions.

8. The electrical apparatus of claim 7 in which third curved plate means affixed to each end of the uppermost of said yoke members, fourth curved plate means are affixed to the upper portions of said cylindrical portion of said enclosure adjacent each end of said uppermost yoke, said third and fourth curved plate means having vertical axes of curvature and being nested at each end of said uppermost yoke member.

9. Stationary electrical induction apparatus comprising an electrical device within a sealed enclosure, said enclosure having a central cylindrical portion with a horizontal axis, track means in said cylindrical portion, said device being slidably mounted on said track means, and means for preventing horizontal movement of said device comprising first curved plates affixed to said device adjacent the ends of said track means, second curved plates engaging first curved plates and affixed to said enclosure, said first and second plates having vertical axes of curvature with engaging curved plates being in nested relationship.

No references cited.